(12) United States Patent
Nakamura et al.

(10) Patent No.: US 11,505,185 B2
(45) Date of Patent: Nov. 22, 2022

(54) DRIVING ASSIST DEVICE

(71) Applicant: TOYOTA JIDOSHA KABUSHIKI KAISHA, Toyota (JP)

(72) Inventors: Satoshi Nakamura, Susono (JP); Minami Sato, Ebina (JP); Kazuyuki Fujita, Gotemba (JP); Takahisa Awata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 348 days.

(21) Appl. No.: 16/923,827

(22) Filed: Jul. 8, 2020

(65) Prior Publication Data

US 2021/0070284 A1 Mar. 11, 2021

(30) Foreign Application Priority Data

Sep. 6, 2019 (JP) .............................. JP2019-163209

(51) Int. Cl.
*B60W 30/095* (2012.01)
*B60W 30/09* (2012.01)

(52) U.S. Cl.
CPC .......... *B60W 30/095* (2013.01); *B60W 30/09* (2013.01); *B60W 2420/42* (2013.01); *B60W 2552/53* (2020.02)

(58) Field of Classification Search
CPC .............. B60W 30/095; B60W 30/09; B60W 2420/42; B60W 2552/53; B60W 2420/52; B60W 30/0956; B60W 2554/4029
See application file for complete search history.

(56) References Cited

U.S. PATENT DOCUMENTS

| 10,576,970 | B2 * | 3/2020 | Rittger | B60W 30/0956 |
| 2016/0167650 | A1 * | 6/2016 | Clarke | G06T 7/70 |
| | | | | 701/28 |
| 2017/0327110 | A1 | 11/2017 | Inoue et al. | |
| 2018/0022328 | A1 | 1/2018 | Tochigi et al. | |
| 2018/0148092 | A1 | 5/2018 | Kataoka | |
| 2019/0011912 | A1 * | 1/2019 | Lockwood | G05D 1/0027 |
| 2019/0375399 | A1 * | 12/2019 | Kasaiezadeh Mahabadi | |
| | | | | G06V 20/588 |

(Continued)

FOREIGN PATENT DOCUMENTS

| JP | 2017-206040 A | 11/2017 |
| JP | 2018-012360 A | 1/2018 |

(Continued)

*Primary Examiner* — Jason Holloway
(74) *Attorney, Agent, or Firm* — Sughrue Mion, PLLC

(57) ABSTRACT

A driving assist device for a vehicle sets a a roadway area ahead of the vehicle, detects an avoidance target existing ahead of the vehicle, and executes collision avoidance control that avoids a collision between the vehicle and the avoidance target. The collision avoidance control is more likely to be executed when the avoidance target is within the roadway area than when the avoidance target is outside the roadway area. The driving assist device detects a roadway end object and a first lane marking of a first lane in which the vehicle exists. An imaginary position is a position apart from the detected position of the roadway end object toward the first lane by a constant distance. The driving assist device sets the imaginary position or the detected position of the the first lane marking as a boundary position of the roadway area based on a predetermined condition.

4 Claims, 12 Drawing Sheets

(56) References Cited

U.S. PATENT DOCUMENTS

2020/0089240 A1 3/2020 Sasagawa et al.
2020/0122719 A1 4/2020 Sasagawa et al.

FOREIGN PATENT DOCUMENTS

| JP | 2018-83563 A | 5/2018 |
| JP | 2018-083578 A | 5/2018 |
| JP | 2020-046926 A | 3/2020 |
| JP | 2020-066300 A | 4/2020 |

* cited by examiner

DRIVING ASSIST DEVICE

BACKGROUND

Technical Field

The present disclosure relates to a driving assist device that assists driving of a vehicle.

Background Art

Patent Literature 1 discloses a driving assist device. The driving assist device sets a predetermined range according to which area (roadway area/sidewalk area) a position of an object detected based on a camera or a radar exists. When a future position of the object exists within the predetermined range, the driving assist device performs avoidance control, specifically braking, for avoiding the object. The driving assist device sets the roadway area based on a curb, a guard rail, or the like.

Patent Literature 2 discloses a driving assist device. The driving assist device detects a pedestrian or the like moving in a roadside and executes automated steering control so that a vehicle moves in a direction away from the detected pedestrian or the like.

Patent Literature 3 and Patent Literature 4 disclose lane departure prevention control.

List of Related Art

Patent Literature 1: Japanese Laid-Open Patent Application Publication No. JP-2018-12360

Patent Literature 2: Japanese Laid-Open Patent Application Publication No. JP-2017-206040

Patent Literature 3: Japanese Laid-Open Patent Application Publication No. JP-2018-83563

Patent Literature 4: Japanese Laid-Open Patent Application Publication No. JP-2018-83578

SUMMARY

Collision avoidance control for avoiding a collision between a vehicle and an avoidance target is considered. As disclosed in Patent Literature 1, the collision avoidance control is more likely to be executed when the avoidance target is within a roadway area than when the avoidance target is outside the roadway area. However, when a position of a roadway end object such as a curb and a guard rail is set as a boundary position of the roadway area, the roadway area may be set unnecessarily wide depending on the position of the roadway end object. When the roadway area is set unnecessarily wide, a pedestrian for example that does not require steering to avoid may be judged as the avoidance target and thus unnecessary steering assist may be execute frequently. That is to say, an unnecessary operation of the collision avoidance control may be caused.

An object of the present disclosure is to provide collision avoidance control for avoiding an avoidance target detected in a roadway area and to suppress an unnecessary operation of the collision avoidance control due to unnecessarily wide roadway area.

In a first aspect of the present disclosure, a driving assist device that assists driving of a vehicle is provided.

The driving assist device includes:
a processor; and
a memory device configured to store surrounding situation information indicating a situation around the vehicle detected by a sensor installed on the vehicle.

The processor is configured to execute:
roadway area setting processing that sets a roadway area ahead of the vehicle based on the surrounding situation information;
avoidance target detection processing that detects an avoidance target existing ahead of the vehicle based on the surrounding situation information; and
collision avoidance control that avoids a collision between the vehicle and the avoidance target.

The collision avoidance control is more likely to be executed when the avoidance target is within the roadway area than when the avoidance target is outside the roadway area.

A roadway in which the vehicle exists includes a first lane in which the vehicle exists.

The processor detects a first lane marking being a lane marking of the first lane and a roadway end object being an obstacle representing an end of the roadway, based on the surrounding situation information.

An imaginary position is a position apart from a detected position of the roadway end object toward the first lane by a constant distance.

In the roadway area setting processing, the processor sets the imaginary position or a detected position of the first lane marking as a boundary position of the roadway area based on a predetermined condition.

A second aspect of the present disclosure further has the following feature in addition to the first aspect.

In the roadway area setting processing, the processor is further configured to:
sets the imaginary position as the boundary position of the roadway area, when the imaginary position is farther than the detected position of the first lane marking when viewed from the vehicle; and
sets the detected position of the first lane marking as the boundary position of the roadway area, when the imaginary position is equal to the detected position of the first lane marking or when the imaginary position is closer than the detected position of the first lane marking when viewed from the vehicle.

A third aspect of the present disclosure further has the following feature in addition to the first aspect.

An edge line is a lane marking closest to the roadway end object among lane markings existing between the vehicle and the roadway end object.

In the roadway area setting processing, the processor is further configured to:
set the imaginary position as the boundary position of the roadway area, when the first lane marking is not the edge line; and set the detected position of the first lane marking as the boundary position of the roadway area, when the first lane marking is the edge line.

A fourth aspect of the present disclosure further has the following feature in addition to any one of the first to third aspects.

The roadway area includes a plurality of lanes.

According to the first aspect, based on the predetermined condition, the imaginary position being apart from the detected position of the roadway end object toward the first lane by the constant distance or the detected position of the first lane marking of the first lane in which the vehicle exists is set as the boundary position of the roadway area. Therefore, it is suppressed that the roadway area is set unnecessarily wide. As a result, the unnecessary operation of the collision avoidance control is suppressed.

According to the second aspect, it is suppressed that the roadway area is set unnecessary wide, and thus the unnecessary operation of the collision avoidance control is suppressed. Furthermore, when the imaginary position is equal to the detected position of the first lane marking or closer to the vehicle than the detected position of the first lane marking is, the detected position of the first lane marking is set as the boundary position of the roadway area. Since the roadway area is prevented from becoming smaller than the first lane in which the vehicle exists, it is possible to appropriately execute the collision avoidance control.

According to the third aspect, it is suppressed that the roadway area is set unnecessary wide, and thus the unnecessary operation of the collision avoidance control is suppressed. Furthermore, when the first lane marking of the first lane is the edge line, the detected position of the first lane marking is set as the boundary position of the roadway area. Since the roadway area is prevented from becoming smaller than the first lane in which the vehicle exists, it is possible to appropriately execute the collision avoidance control.

According to the fourth aspect, it is possible to set the roadway area across the plurality of lanes to suppress the unnecessary operation.

EMBODIMENTS

Figure 1:
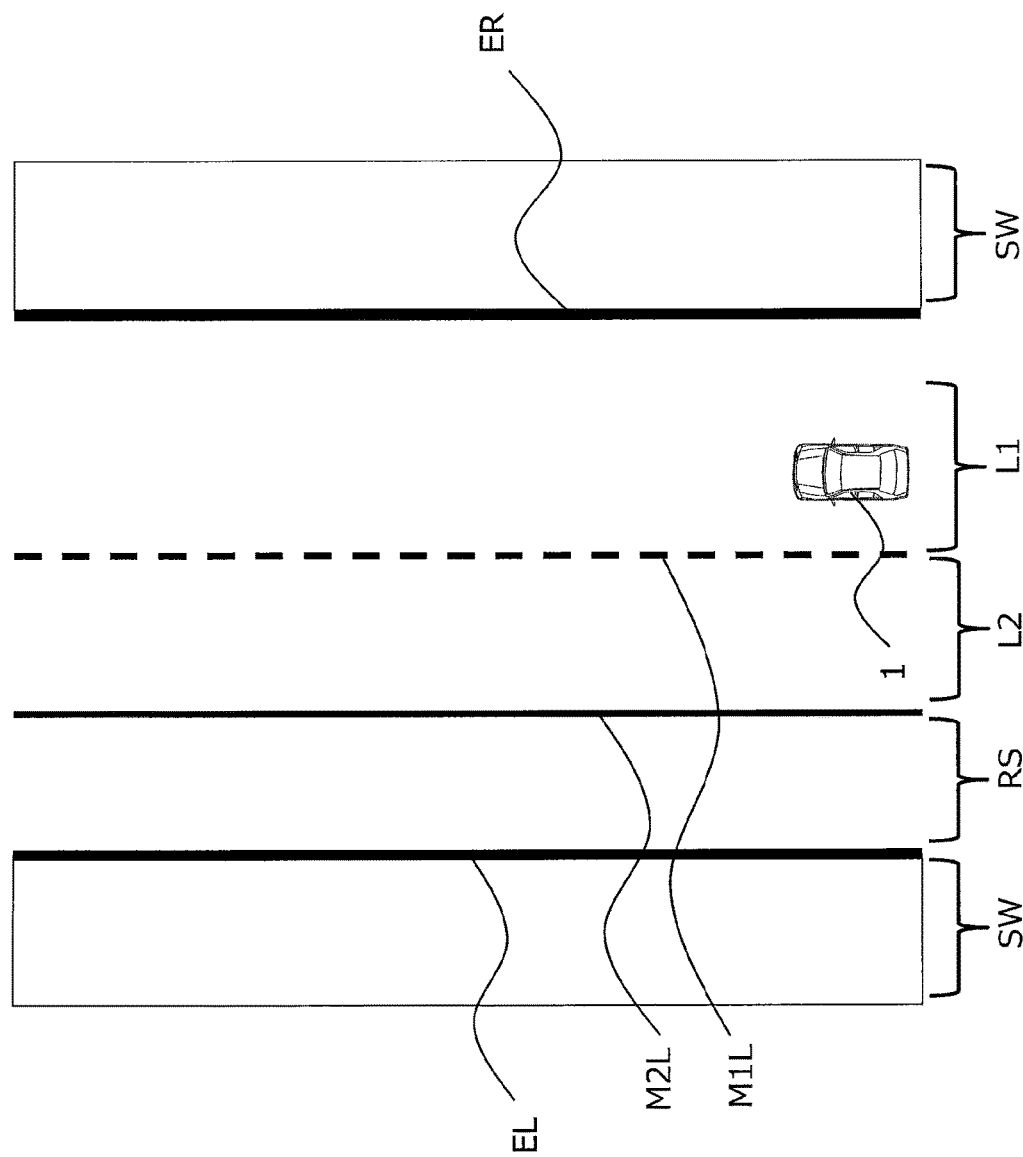
FIG. 1 is a diagram schematically showing an example of a roadway in a first embodiment of the present disclosure.

Hereinafter, embodiments of the present disclosure will be described with reference to the accompanying drawings. However, the present disclosure is not limited to the following embodiments. In the following description, a redundant description will be omitted by the use of the same reference numerals for the same or equivalent elements.

First Embodiment

FIG. 1 shows an example of a roadway in the present embodiment. A road includes at least a roadway and a roadway end object E. The road may further include a sidewalk SW other than the roadway. The roadway may include a lane, a road shoulder RS, a side strip, and the like depending on whether lane marking and the sidewalk SW exist or not. The roadway may include a plurality of lanes.

The roadway end object E is a three-dimensional obstacle that can suppress a vehicle 1 from moving from the roadway into the outside of the roadway. More particularly, the roadway end object E is a three-dimensional obstacle that can suppress an intrusion speed or an intrusion distance of the vehicle 1 from the roadway into the outside of the roadway as compared with a case where no road end object E exists in the road. The roadway end object E is an obstacle that exists continuously or discretely along the roadway or a lane marking. The roadway end object E is exemplified by a curb, a guard rail, a guard pole, a median strip, a wall, a fence, a building, grass on an unpaved road, a pylon, and the like. In the situation shown in FIG. 1, a roadway end object EL exists at a left end of the roadway, and a roadway end object ER exists at a right end of the roadway. The roadway end object EL exists between the sidewalk SW and the road shoulder RS.

The sidewalk SW is an area where pedestrians walk, and it is prohibited along the roadway extension direction that vehicles enter into it.

The vehicle 1 exists in a first lane L1 on the roadway. A second lane L2 on the roadway is an adjacent lane on a left side of the first lane L1. The roadway shown in FIG. 1 includes the road shoulder RS and the roadway end objects EL and ER in addition to the first lane L1 and the second lane L2. It should be noted that when the sidewalk SW does not exist in the situation shown in FIG. 1, there is a side strip in place of the road shoulder RS, and the present disclosure can also be applied to that case where the side strip exists.

A first lane marking MIL is a lane marking on a left side of the vehicle 1 among lane markings of the first lane L1, and is the nearest lane marking on the left side of the vehicle 1. A second lane marking M2L is a lane marking on a side of the roadway end object EL among lane markings of the second lane L2. In the situation shown in FIG. 1, the second lane marking M2L is an edge line on the left side of vehicle 1. Here, the edge line is an outermost lane marking among lane markings on the roadway. For example, in a usual road, the roadway end object E exists. In that case, the edge line is a lane marking closest to the roadway end object ER or the roadway end object EL. For example, a lane marking closest to the curb is the edge line.

The road shoulder RS is an area that exists between the edge line and the sidewalk SW. The road shoulders RS may exist on the left and right sides of the roadway, respectively. Usually, the roadway end object E exists at a boundary between the roadway and the sidewalk SW, and thus the road shoulder RS is often an area that exists between the edge line and the roadway end object E. In the situation shown in FIG. 1, the road shoulder RS exists on a left part of the roadway, and no road shoulder exists on a right part of the car road. By the way, a side strip is a strip-shaped road portion provided near a road end of a road having no sidewalk or on a no-sidewalk side of a road, and is an area partitioned by a road marking such as the edge line. Therefore, the edge line can be a boundary between the roadway and an area substituting for the sidewalk.

Figure 2:
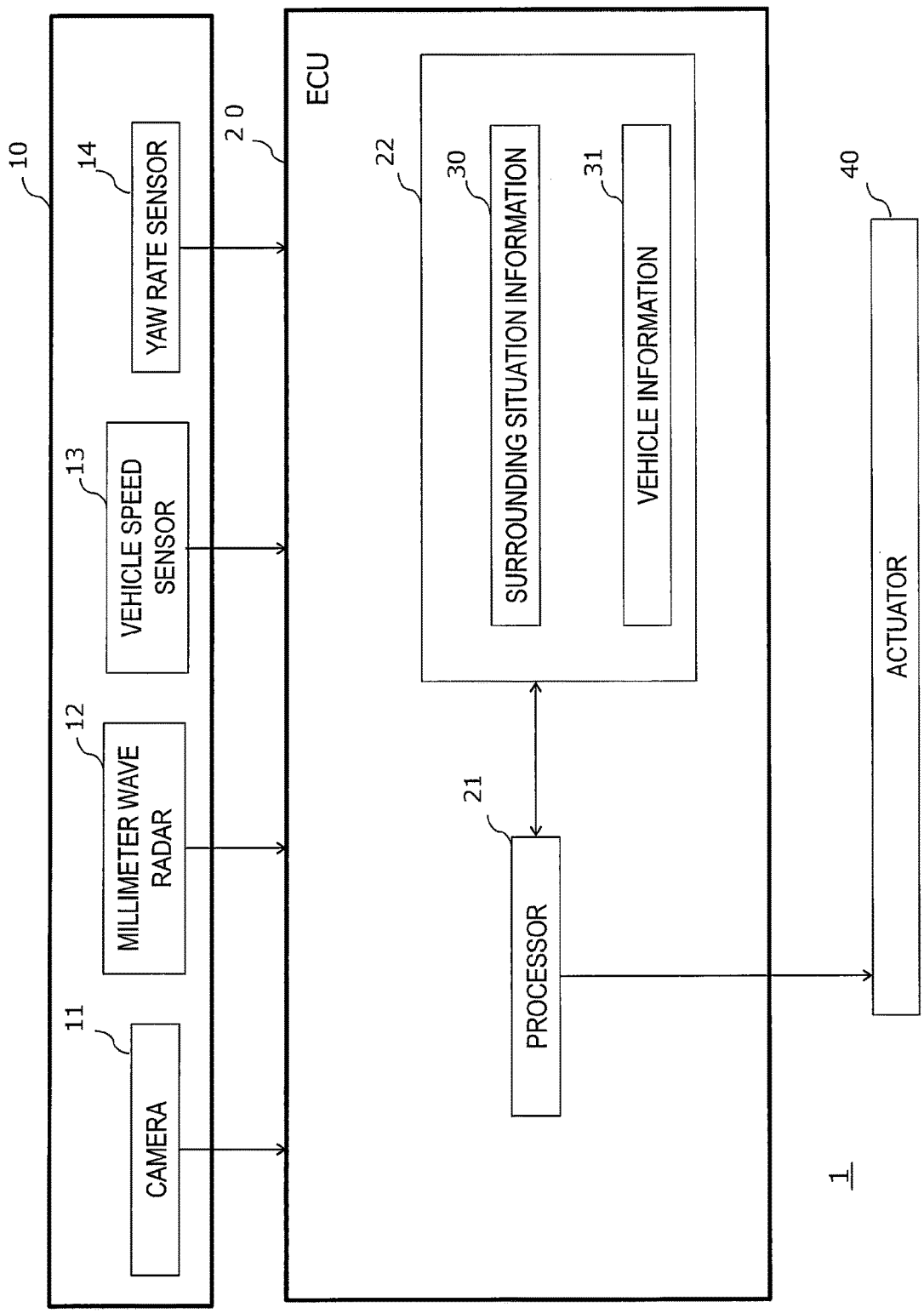
FIG. 2 is a block diagram showing an example of a configuration of a vehicle provided with a driving assist device according to embodiments of the present disclosure.

FIG. 2 is a block diagram showing a configuration example of the vehicle 1 including a driving assist device according to the present embodiment. The vehicle 1 includes sensors 10, an ECU (Electrical Control Unit) 20, and an actuator 40. The sensors 10 include a camera 11, a millimeter-wave radar 12, a vehicle speed sensor 13, and a yaw rate sensor 14. The driving assist device that assists driving of vehicle 1 includes at least the ECU 20, and may further include the sensors 10 and the actuator 40.

The camera 11 is an imaging device that acquires image information ahead of the vehicle 1. The camera 11 detects an object ahead of the vehicle 1. For example, the camera 11 detects objects such as pedestrians, the roadway end object, the lane marking, the lane, and the like ahead of the vehicle 1. The millimeter-wave radar 12 is a ranging sensor that performs ranging for an object around the vehicle 1 by means of millimeter waves. The millimeter-wave radar 12 detects an object based on a reflected wave. Surrounding situation information 30 indicates a situation around the vehicle 1. The camera 11 and the millimeter-wave radar 12 acquires the surrounding situation information 30 in time series and transmits it to the ECU 20. It should be noted that the vehicle 1 may include another ranging sensor such as an infrared radar, a LiDAR (Light Detection and Ranging), and the like. Such the ranging sensor also acquires the surrounding situation information 30 in time series and transmits it to the ECU 20, as in the case of the millimeter-wave radar 12.

The vehicle speed sensor 13 is a sensor for detecting a vehicle speed of the vehicle 1. The yaw rate sensor 14 is a sensor for detecting a yaw rate of the vehicle 1. The vehicle speed sensor 13 and the yaw rate sensor 14 respectively transmit the vehicle speed and the yaw rate of the vehicle 1 as vehicle information 31 to the ECU 20. That is, the vehicle information 31 indicates a travel state of the vehicle 1.

The ECU 20 is a microcomputer including a processor 21 and a memory device 22. The ECU 20 achieves a variety of processing by the processor 21 executing various programs stored in the memory device 22. The ECU 20 may include a plurality of ECUs. The processor 21 executes a variety of processing which will be described later, based on the surrounding situation information 30 received from the camera 11 and the millimeter-wave radar 12 and the vehicle information 31 received from the vehicle speed sensor 13 and the yaw rate sensor 14. The memory device 22 stores a variety of information such as the various programs, the surrounding situation information 30, the vehicle information 31, and the like.

The actuator 40 performs steering (turning a wheel), acceleration, and deceleration of the vehicle 1. For example, the actuator 40 includes an electric power steering device (Electric Power Steering (EPS)), a drive device (e.g., an engine, an electric motor), and a braking device. The actuator 40 actuates each device in accordance with a control signal transmitted from the ECU 20.

First, an overview of the processor 21 will be described. The processor 21 controls an overall operation of the vehicle 1. In particular, in the present embodiment, the processor 21 executes "collision avoidance control" that assists avoidance of a collision between the vehicle 1 and an avoidance target around the vehicle 1. The avoidance target is an object with which the vehicle 1 should avoid a collision or to which the vehicle 1 should not get closer. The avoidance target is detected based on the surrounding situation information 30. The avoidance target is exemplified by a pedestrian, an obstacle, another vehicle, a bicycle (or a light vehicle), an animal, and the like. Typically, the avoidance target exists on or near a travel path of the vehicle 1 ahead of the vehicle 1 in a travel direction.

Next, the processing of the processor 21 will be described. The processor 21 acquires image information acquired by the camera 11 and radar information indicating a result of detection by the millimeter-wave radar 12, as the surrounding situation information 30. Moreover, the processor 21 acquires the vehicle speed detected by the vehicle speed sensor 13 and the yaw rate detected by the yaw rate sensor 14, as the vehicle information 31. The surrounding situation information 30 and the vehicle information 31 are stored in the memory device 22.

Based on the surrounding situation information 30 received from the camera 11, the processor 21 detects the lane marking (a roadway center line, the edge line, etc.) and acquires lane marking information regarding the lane marking. The lane marking information includes presence or absence, a type, and a detected position of the lane marking.

Based on the surrounding situation information 30 received from the camera 11 and the millimeter-wave radar 12, the processor 21 detects the roadway end object E and acquires roadway end information regarding the roadway end object E. The roadway end information includes presence or absence, a type, and a detected position of the roadway end object E.

The processor 21 detects the avoidance target based on the surrounding situation information 30. In the following description, as an example, a case where the avoidance target is a pedestrian is considered.

The processor 21 detects the pedestrian located around the vehicle 1 and acquires pedestrian information regarding the pedestrian. The pedestrian information includes a position of the pedestrian, a behavior of the pedestrian (e.g., translation, stopped, crossing), and a moving speed of the pedestrian. The position of the pedestrian is, for example, a relative position of the pedestrian with respect to the vehicle 1 (i.e., a relative distance, and longitudinal and lateral positions in a plane coordinate system). The moving speed of the pedestrian is, for example, a relative speed of the pedestrian with respect to the vehicle 1.

Based on the surrounding situation information 30, the processor 21 sets at least a roadway area and an area outside the roadway area in a surrounding area around the vehicle 1. More specifically, the processor 21 sets a left-side boundary position and a right-side boundary position of the roadway area, in at least an area existing ahead of the vehicle 1. The processor 21 sets the roadway area between the left-side and right-side boundary positions. That is, the boundary position is a boundary between the roadway area and the outside of the roadway area. The roadway area includes the first lane L1. The area outside the roadway area includes at least a part of the road shoulder RS and does not include the roadway area. A concrete method for setting the roadway area will be described later.

Based on the roadway area, the processor 21 sets an assist range used for activating the collision avoidance control. As a simplest example, the roadway area itself is used as the assist range.

As another example, the assist range when the pedestrian is located within the roadway area may be set to be larger than that when the pedestrian is located outside the roadway area, as disclosed in the above-mentioned Patent Literature 1 (Japanese Laid-Open Patent Application Publication No. JP-2018-12360). In this case, the processor 21 determines whether or not the pedestrian is located within the roadway area based on the pedestrian information, and sets the assist range based on a result of the determination.

The processor 21 predicts a future position of the vehicle 1 based on the vehicle information 31, and predicts a future position of the pedestrian based on the pedestrian information. Furthermore, the processor 21 predicts whether or not the pedestrian is located within the above-described assist range within a predetermined time. When predicting that the pedestrian is located within the assist range within the predetermined time, the processor 21 executes the collision avoidance control to avoid a collision with the pedestrian. Therefore, when the pedestrian is located within the roadway area, the collision avoidance control is more likely to be executed as compared with a case where the pedestrian is outside the roadway area.

In the collision avoidance control, the processor 21 controls an operation of the actuator 40 so as to avoid the collision with the pedestrian. Typically, the processor 21 calculates a target deceleration necessary for avoiding the collision with the pedestrian and calculates a required control amount of the braking device required to achieve the target deceleration. The processor 21 may further calculate a target steering angle necessary for avoiding the collision with the pedestrian and calculate a required control amount of the EPS device required to achieve the target steering angle. The processor 21 outputs a control signal indicating the required control amount to the actuator 40. The actuator 40 operates in accordance with the control signal.

Figure 3:
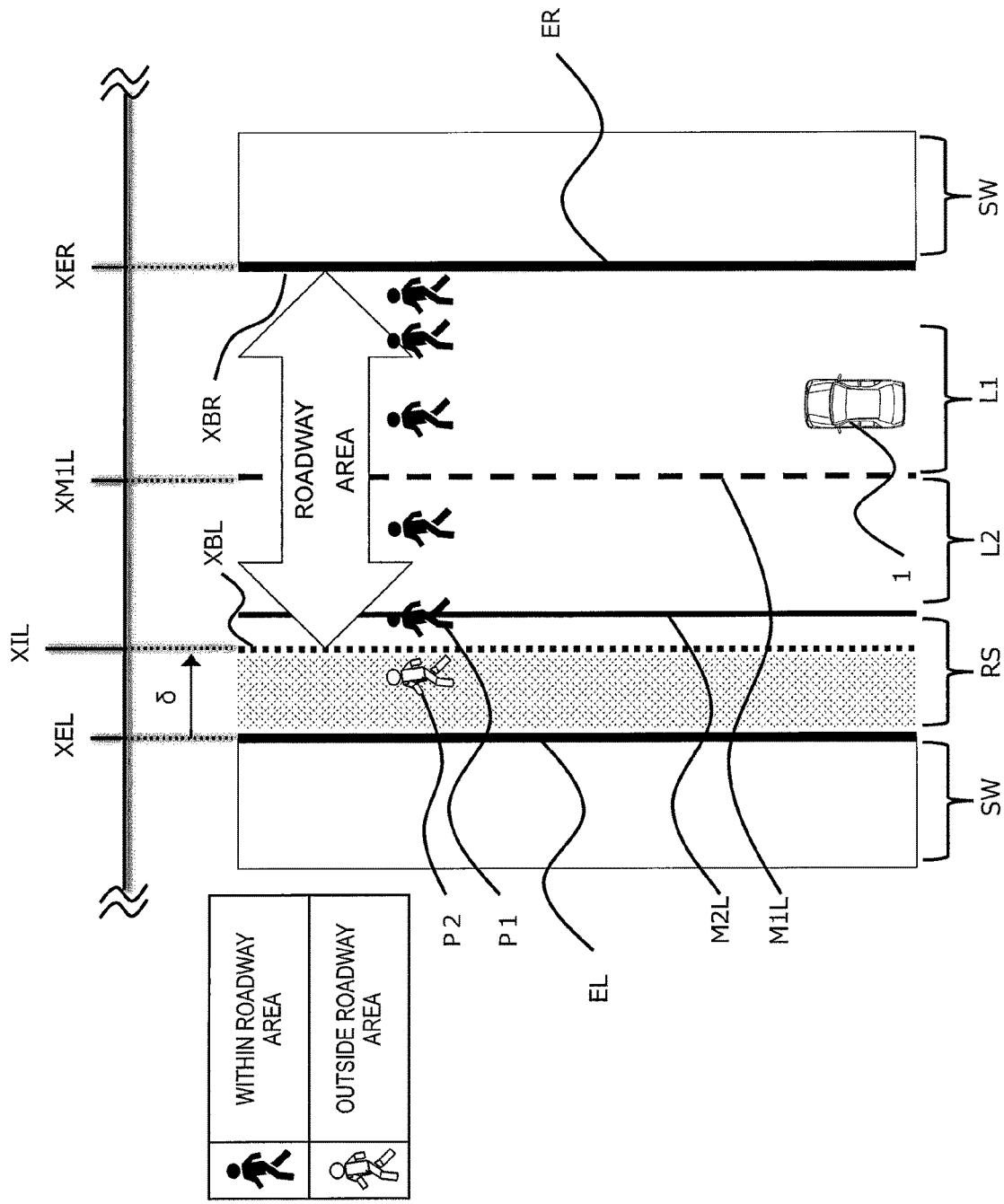
FIG. 3 is a diagram schematically showing an example of a roadway area in the first embodiment of the present disclosure.

FIG. 3 shows an example of the roadway area in the present embodiment. Hereinafter, an overlapping description with FIG. 1 will be omitted as appropriate. The roadway end object EL, the roadway end object ER, and the first lane marking M1L are detected based on the surrounding situation information 30. A detected position XEL is the detected position of the roadway end object EL. A detected position XER is the detected position of the roadway end object ER. A detected position XM1L is the detected position of the first lane marking M1L. As for the second lane marking M2L (i.e. the edge line), at least its presence is detected. However, a position of the second lane marking M2L is not necessary detected accurately.

An imaginary position XIL is a position apart from the detected position XEL of the roadway end object EL toward the first lane L1 (i.e., the vehicle 1) by a constant distance δ. The imaginary position XIL is virtually calculated by the processor 21. The constant distance δ is an arbitrary value about a width of the road shoulder RS commonly present in that region (e.g., 0.5 m, 3 m, etc.). For example, the constant distance δ is set in advance according to laws and regulations of a country or a region where the vehicle 1 actually travels, a road condition of the country or the region, and the like.

A boundary position XBL is a position of a boundary of the roadway area on the left side of the vehicle 1. A boundary position XBR is a position of a boundary of the roadway area on the right side of the vehicle 1. The roadway area is an area between the boundary position XBL and the boundary position XBR. In the example illustrated in FIG. 3, the processor 21 sets the imaginary position XIL and the detected position XER of the roadway end object ER as the boundary position XBL and the boundary position XBR, respectively. That is, the processor 21 sets the area between the boundary positions XBL and XBR as the roadway area. The left end of the roadway area is a line connecting the imaginary position XIL calculated by the processor 21.

A pedestrian P1 and a pedestrian P2 in FIG. 3 will be described. The pedestrian P1 is located within the roadway area. On the other hand, the pedestrian P2 is located outside the roadway area. The collision avoidance control is more likely to be activated with respect to the pedestrian P1, and the collision avoidance control is less likely to be activated with respect to the pedestrian P2.

As shown in FIG. 3, the left-side boundary position XBL of the roadway area is closer to the vehicle 1 than the detected position XEL of the roadway end object EL is. Therefore, the roadway area becomes smaller as compared with a case where the detected position XEL of the roadway end object EL is used as the boundary position XBL. In other words, the roadway area becomes smaller by the constant distance δ over the road shoulder RS. As a result, an unnecessary operation of the collision avoidance control is suppressed.

Figure 4:
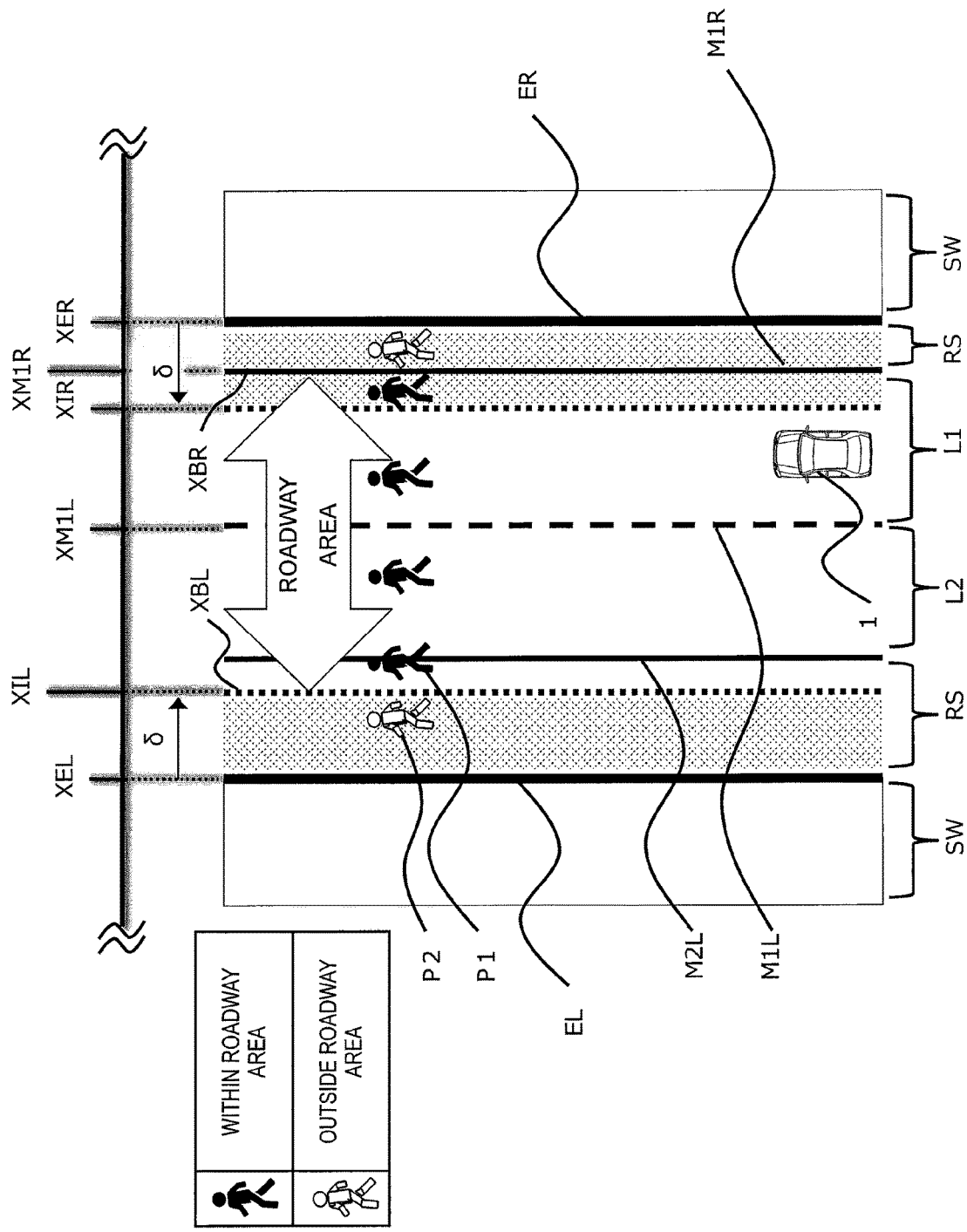
FIG. 4 is a diagram schematically showing another example of the roadway area in the first embodiment of the present disclosure.

FIG. 4 shows another example of the roadway area in the present embodiment. It should be noted that an overlapping description with FIG. 3 will be omitted. A first lane marking M1R is the first lane marking on the right side of the vehicle 1 among the lane markings of the first lane L1, and is an edge line on the right side of the vehicle 1.

In the situation shown in FIG. 4, the processor 21 calculates, as an imaginary position XIR, a position apart from the detected position XER of the roadway end object ER toward the first lane L1 by the constant distance δ. However, when viewed from the vehicle 1, the imaginary position XIR is closer than the detected position XM1R of the first lane marking M1R of the first lane L1. If the imaginary position XIR is set as the right-side boundary position XBR of the roadway area, the roadway area becomes too small and thus the collision avoidance control is not executed appropriately. In view of the above, the processor 21 sets not the imaginary position XIR but the detected position XM1R of the first lane marking M1R as the boundary position XBR of the roadway area. Since the roadway area is prevented from becoming smaller than the first lane L1, it is possible to appropriately execute the collision avoidance control.

In the example shown in FIG. 4, the processor 21 sets the boundary position XBR at a different position from that in FIG. 3 and thus sets a different roadway area from that in FIG. 3. That is, when there is the edge line, the processor 21 sets a width of the roadway area narrower than that when there is no edge line.

Figure 5:
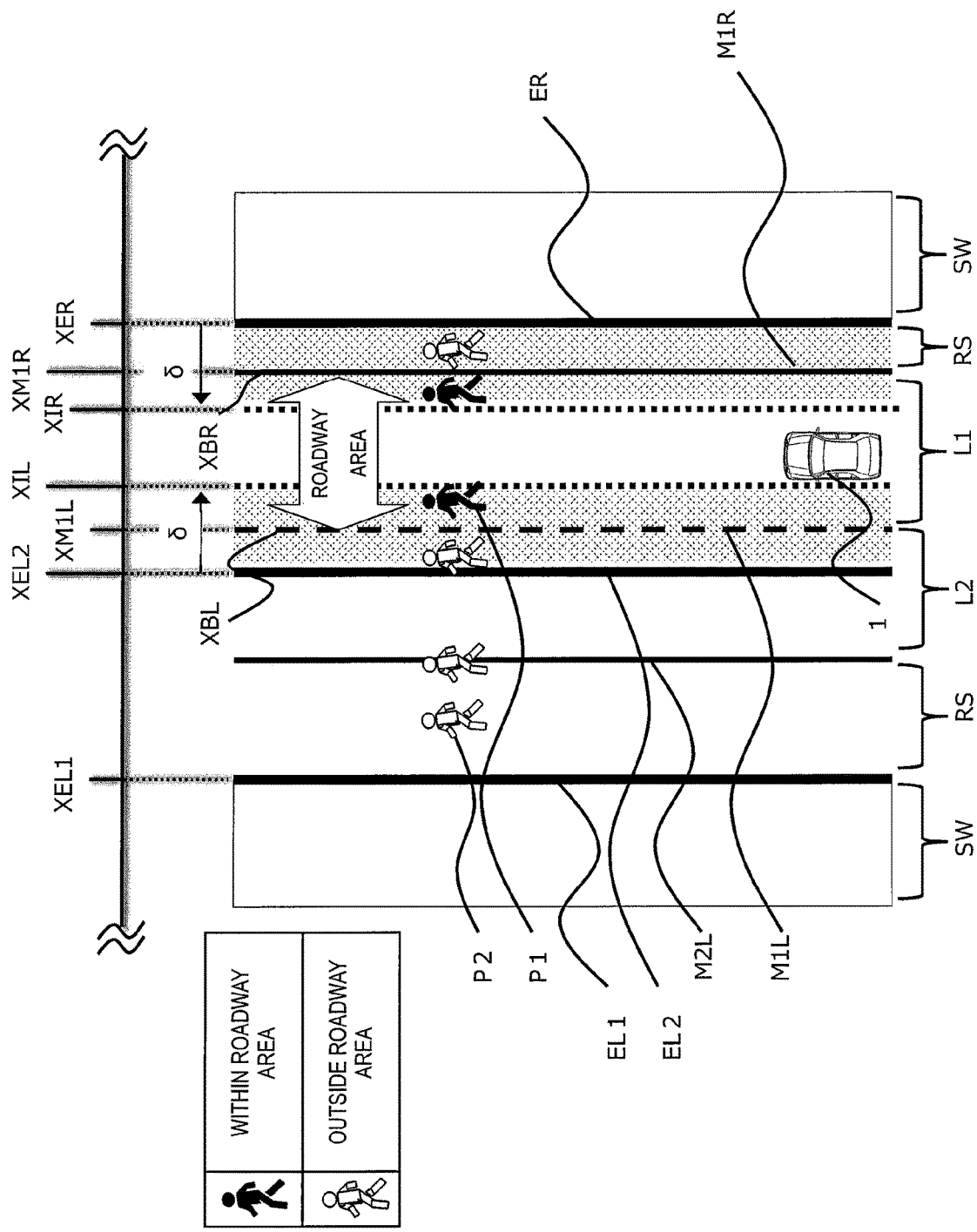
FIG. 5 is a diagram schematically showing still another example of the roadway area in the first embodiment of the present disclosure.

FIG. 5 shows still another example of the roadway area in the present embodiment. It should be noted that an overlapping description with FIGS. 3 and 4 will be omitted. Comparing FIG. 5 with FIGS. 3 and 4, there are a plurality of roadway end objects EL1 and EL2 on the left side of the vehicle 1 on the road ahead of the vehicle 1. In such a case, the processor 21 determines, based on the surrounding situation information 30, which of a detected position XEL1 of the roadway end object EL1 and a detected position XEL2 of the roadway end object EL2 is closer to the vehicle 1. Then, the processor 21 calculates the imaginary position XIL based on the detected position XEL2 of the roadway end object EL2 closer to the vehicle 1. That is, the processor 21 calculates a position apart from the detected position XEL2 of the roadway end object EL2 toward the first lane L1 by the constant distance δ as the imaginary position XIL.

In the example shown in FIG. 5, when viewed from the vehicle 1, the imaginary position XIL is closer than the detected position XM1L of the first lane marking MlL of the first lane L1. If the imaginary position XIL is set as the left-side boundary position XBL of the roadway area, the roadway area becomes too small and thus the collision avoidance control is not executed appropriately. In view of the above, the processor 21 sets not the imaginary position XIL but the detected position XM1L of the first lane marking MIL as the boundary position XBL of the roadway area. Since the road area is prevented from becoming smaller than the first lane L1, it is possible to appropriately execute the collision avoidance control.

An example where a situation shown in FIG. 5 occurs includes a lane-restricted road, a construction site, and the like. For example, the roadway end object EL1 is an obstacle that can suppress the vehicle 1 from moving from the roadway into an area outside the roadway (e.g., the sidewalk SW) in a case of a normal road. The roadway end object EL2 is an obstacle that can suppress the vehicle 1 from moving into an area outside the roadway end object EL2 (e.g., the sidewalk SW, the road shoulder RS, and the second lane L2). Depending on sizes and positions of the roadway end objects EL1 and EL2, the processor 21 can detect both the roadway end objects EL1 and EL2 and the respective detected positions XEL1 and XEL2. An area between the first lane marking MIL and the roadway end object EL2 corresponds to a substantial road shoulder RS.

Figure 6:
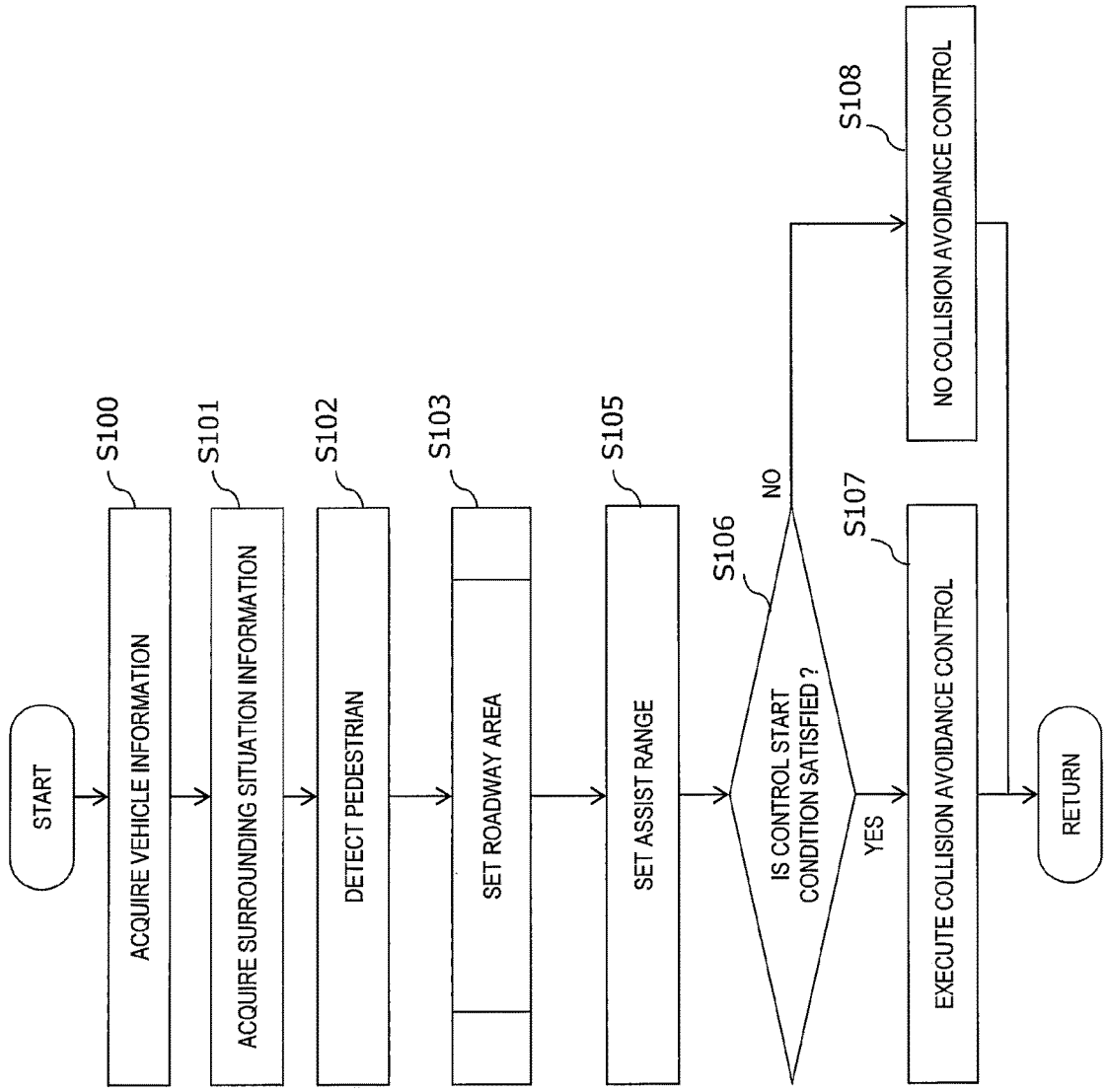
FIG. 6 is a flow chart showing processing executed by a processor in the first embodiment of the present disclosure.

FIG. 6 is a flow chart showing processing executed by the processor 21 in the present embodiment. Preferably, in a state where the vehicle 1 can travel, the processor 21 always executes a series of processes shown in FIG. 6. However, the present disclosure is not limited to that. The processor 21 may start the processing only when the vehicle information 31 and the surrounding situation information 30 satisfy a specific condition. For example, the processor 21 may execute the processing when the vehicle 1 is running.

In Step S100, the processor 21 acquires the vehicle information 31 from the vehicle speed sensor 13 and the yaw rate sensor 14.

In Step S101, the processor 21 acquires the image information acquired by the camera 11 and the radar information indicating a result of detection by the millimeter-wave radar 12, as the surrounding situation information 30. Moreover, based on the surrounding situation information 30, the processor 21 detects the lane marking (a roadway center line, the edge line, etc.) and acquires the lane marking information regarding the lane marking. The lane marking information includes presence or absence, the type, and the detected position of the lane marking. Furthermore, based on the surrounding situation information 30, the processor 21 detects the roadway end object E and acquires the roadway end information regarding the roadway end object E. The roadway end information includes presence or absence, the type, and the detected position (XEL, XEL1, XEL2, XER) of the roadway end object E.

In Step S102, the processor 21 executes avoidance target detection processing that detects the avoidance target ahead of the vehicle 1 based on the surrounding situation information 30. For example, the avoidance target is a pedestrian. The processor 21 detects the pedestrian ahead of the vehicle 1 and acquires the pedestrian information regarding the pedestrian. The pedestrian information includes the position and the moving speed of the pedestrian.

In Step S103, the processor 21 executes roadway area setting processing that sets the roadway area ahead of the vehicle 1. Details of the roadway area setting processing will be described later.

In Step S105, the processor 21 sets the assist range ahead of the vehicle 1. For example, the processor 21 sets the roadway area itself as the assist range. As another example, the processor 21 may determine whether or not the pedestrian is located within the roadway area based on the pedestrian information to set the assist range dynamically according to a result of the determination. In that case, the assist range when the pedestrian is located within the roadway area is set to be larger than the assist range when the pedestrian is located outside the roadway area.

In subsequent Step S106, the processor 21 determines whether or not a control start condition of the collision avoidance control is satisfied. More specifically, the processor 21 predicts the future position of the pedestrian based on pedestrian information. Moreover, the processor 21 predicts the future position of the vehicle 1 based on the vehicle information 31. Furthermore, the processor 21 predicts whether or not the pedestrian is located within the assist range within a predetermined time. When predicting that the pedestrian is located within the assist range within the predetermined time (Step S106; Yes), the processor 21 executes the collision avoidance control (Step S107). Otherwise (Step S106; No), the processor 21 does not execute the collision avoidance control (Step S108).

Figure 7:
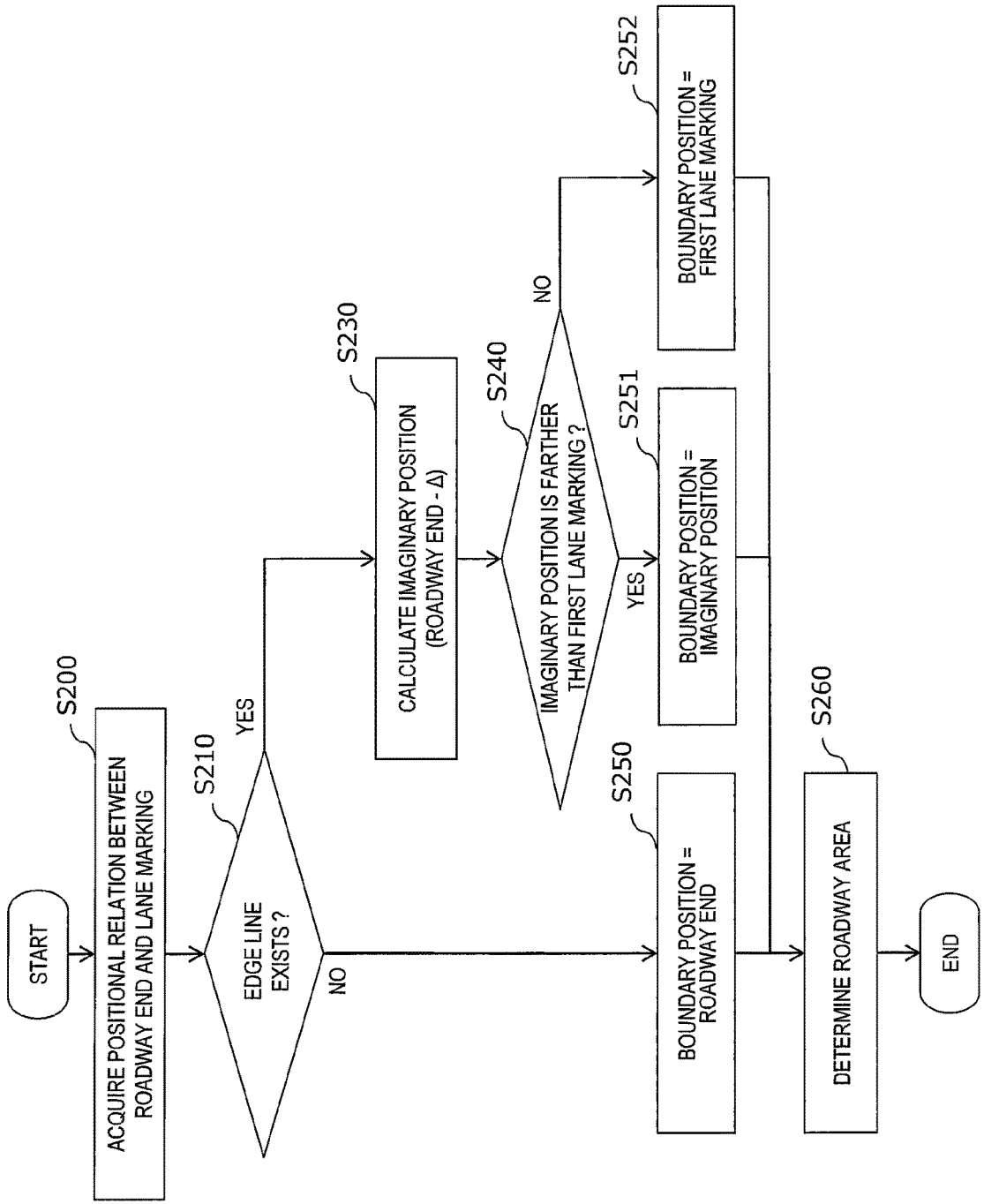
FIG. 7 is a flow chart showing roadway area setting processing executed by the processor in the first embodiment of the present disclosure.

FIG. 7 is a flow chart showing the roadway area setting processing (Step S103) executed by the processor 21 in the present embodiment. When setting the roadway area, the processor 21 sets the boundary positions XBL and XBR independently on the left and right sides of the vehicle 1, respectively. More specifically, the processor 21 sets each of the boundary positions XBL and XBR by executing Steps S200, S210, S230, S240, S250, S251, S252 to be described later. After setting both of the boundary positions XBL and XBR, the processor 21 sets the roadway area in Step S260. Hereinafter, for simplicity, a case of setting the left side of the vehicle 1 (i.e., the side of the boundary position XBL) will be mainly described. The same processing is executed also for the right side of the vehicle 1 (i.e., the side of the boundary position XBR).

In Step S200, based on the lane marking information and the roadway end information, the processor 21 understands presence or absence of the lane marking, the type of the lane marking, the detected position of the lane marking, presence or absence of the roadway end object E, the detected position of the roadway end object E, and the like.

In Step S210, the processor 21 determines whether or not there is the edge line.

When there is no edge line (Step S210; No), the processing proceeds to Step S250. In Step S250, the processor 21 sets the detected position XEL of the roadway end object EL as the boundary position XBL.

On the other hand, when there is the edge line (Step S210; Yes), the processing proceeds to Step S230. In Step S230, the processor 21 calculates, as the imaginary position XIL, a position apart from the detected position XEL of the roadway end object EL toward the first lane L1 by the constant distance δ.

In Step S240 following Step S230, the processor 21 determines whether or not the imaginary position XIL is farther than the detected position XM1L of the first lane marking MIL when viewed from the vehicle 1.

When the imaginary position XIL is farther than the detected position XM1L of the first lane marking M1L when viewed from the vehicle 1 (Step S240; Yes), the processing proceeds to Step S251. In Step S251, the processor 21 sets the imaginary position XIL as the boundary position XBL of the roadway area.

On the other hand, when the imaginary position XIL is closer than the detected position XM1L of the first lane marking M1L when viewed from the vehicle 1 or when the imaginary position XIL is equal to the detected position XM1L of the first lane marking M1L (Step S240; No), the processing proceeds to Step S252. In Step S252, the processor 21 sets the detected position XM1L of the first lane marking M1L as the boundary position XBL.

In the situation shown in FIG. 3, the processor 21 executes the processing of Steps S230 and S251 when setting the boundary position XBL. Moreover, the processor 21 executes Step S250 when setting the boundary position XBR.

Similarly, in the situation shown in FIG. 4, the processor 21 executes the processing of Steps S230 and S251 when setting the boundary position XBL. Moreover, the processor 21 executes Steps S230 and S252 when setting the boundary position XBR.

Similarly, in the situation shown in FIG. 5, the processor 21 executes Steps S230 and S252 when setting each of the boundary positions XBL and XBR.

After both of the boundary positions XBL and XBR are set, the processor 21 sets an area existing between the boundary positions XBL and XBR as the roadway area (Step S260). Typically, the boundary position XBL and the boundary position XBR each is similar to a line segment. In such a case, the processor 21 typically sets a quadrangular area existing between the boundary positions XBL and XBR, as the roadway area.

As described above, according to the first embodiment, the processor 21 sets (selects) the imaginary position or the detected position of the first lane marking as the boundary position of the roadway area based on a predetermined condition. As a result, at least a part of the road shoulder RS (including the area substantially equivalent to the road shoulder RS as shown in FIG. 5) is excluded from the roadway area. Since the avoidance target located in the road shoulder RS is more likely to be located outside the roadway area, the collision avoidance control is less likely to be executed with respect to the avoidance target located in the road shoulder RS. It is thus possible to suppress the unnecessary operation of the collision avoidance control caused by an unnecessarily wide roadway area.

Furthermore, as shown in FIGS. 4 and 5, even when the constant distance δ is too large, the roadway area is set so as to include at least the first lane L1. That is, the roadway area is prevented from becoming unnecessarily small. It is thus possible to appropriately execute the collision avoidance control. Since not only the unnecessary operation of the collision avoidance control is suppressed but also the roadway area is prevented from becoming unnecessarily small, it is possible to secure opportunities of the collision avoidance control.

By the way, it may considered to set a position of the second lane marking M2L of the second lane L2 instead of the position of the roadway end object E as the boundary position XBL of the roadway area. However, the second lane marking M2L is arranged in a plane and is distant from the vehicle 1. Therefore, even if presence of the second lane marking M2L is detected, its position is not necessarily detected (calculated) with high accuracy. For example, since accuracy of the detected position of the second lane marking M2L is low, there is a possibility that the detected position of the second lane marking M2L is located on the outer side of the roadway end object E. On the other hand, as for the roadway end object E being the three-dimensional obstacle, it is possible to detect (calculate) its position with high accuracy by the use of the camera 11 or the millimeter-wave radar 12. Therefore, using the imaginary position XIL as in the present embodiment makes it possible to set more appropriate roadway area capable of suppressing the unnecessary operation as compared with a case where the detected position of the second lane marking M2L is used.

Second Embodiment

Figure 8:
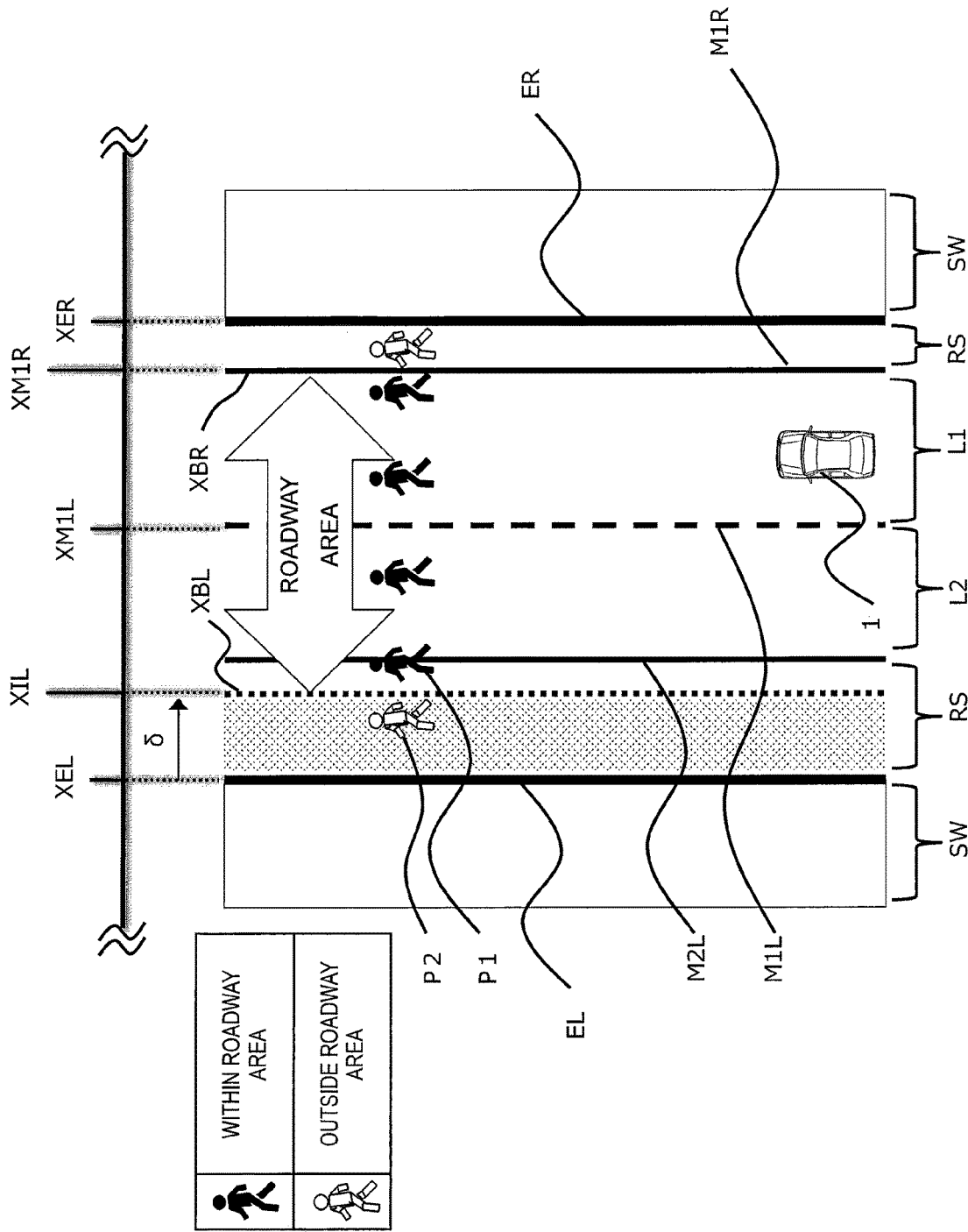
FIG. 8 is a diagram schematically showing an example of the roadway area in a second embodiment of the present disclosure.

In a second embodiment, an example in which the processor 21 sets the roadway area in a manner different from that of the first embodiment is described. In FIG. 8, the right-side first lane marking M1R of the first lane L1 is the edge line. In this case, the processor 21 sets the detected position XM1R of the first lane marking M1R as the right-side boundary position XBR of the roadway area, without calculating the imaginary position XIR.

Figure 9:
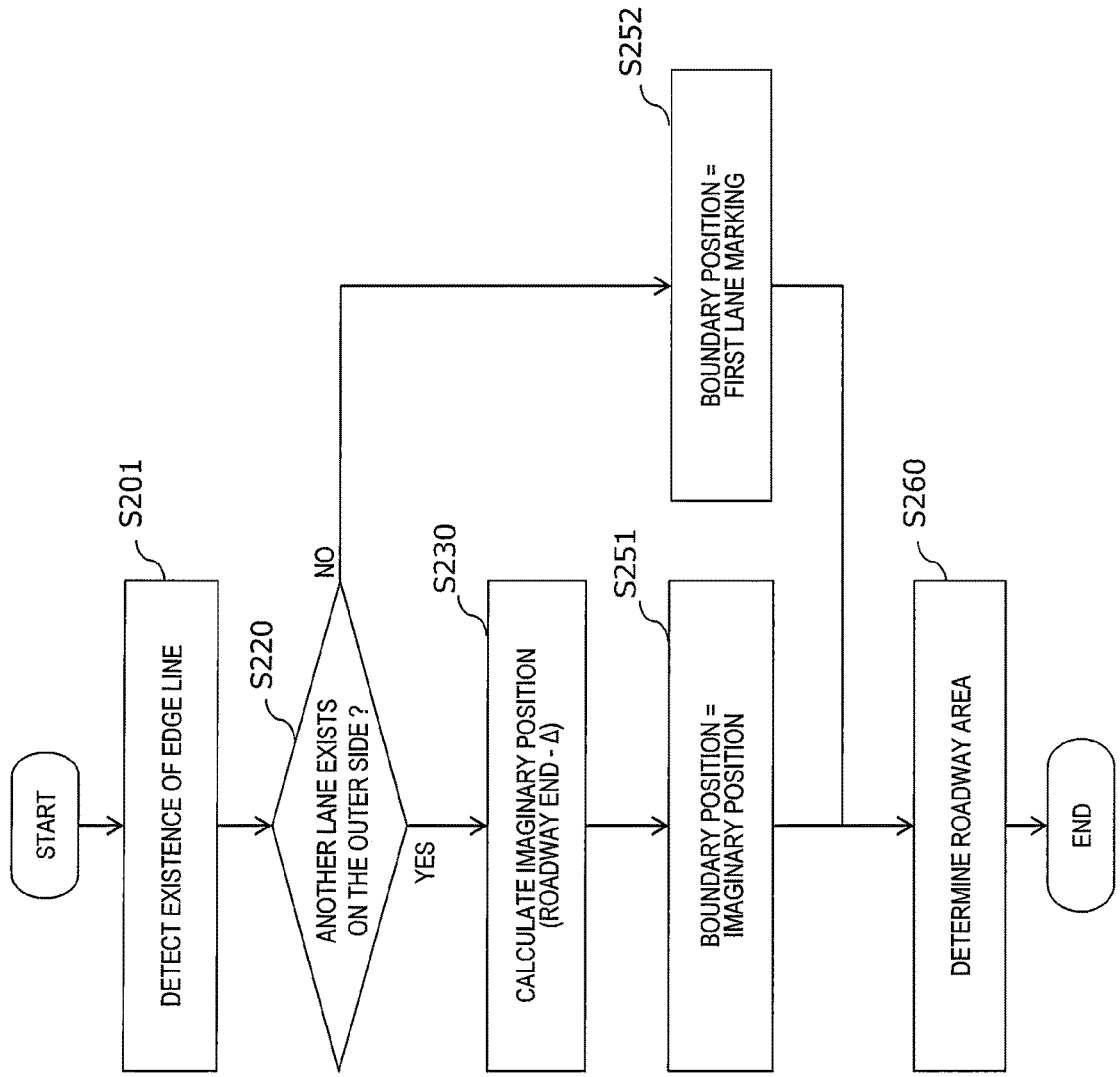
FIG. 9 is a flow chart showing the roadway area setting processing executed by the processor in the second embodiment of the present disclosure.

FIG. 9 is a flow chart showing the roadway area setting processing (Step S103) executed by the processor 21 in the second embodiment. It should be noted that a description of the same processing as in the case of the first embodiment will be omitted as appropriate. When setting the roadway area, the processor 21 sets the boundary positions XBL and XBR independently on the left and right sides of the vehicle 1, respectively. More specifically, the processor 21 sets each of the boundary positions XBL and XBR by executing Steps S201, S220, S230, S251, S252. After setting both of the boundary positions XBL and XBR, the processor 21 sets the roadway area in Step S260.

In Step S201, based on the lane marking information and the roadway end information, the processor 21 understands presence or absence of the lane marking, the type of the lane marking, the detected position of the lane marking, presence or absence of the roadway end object E, the detected position of the roadway end object E, and the like. In addition, the processor 21 detects presence of the edge line.

In subsequent Step S220, the processor 21 determines whether or not another lane exists on the outer side of the first lane L1 in which the vehicle 1 exists. This is equivalent to determining whether or not the first lane marking of the first lane L1 in which the vehicle 1 exists is the edge line.

When another lane exists on the outer side of the first lane L1, that is, when the first lane marking is not the edge line (Step S220; Yes), the processing proceeds to Step S230. Step S230 is the same as in the case of the first embodiment described above. After Step S230, the processing proceeds to Step S251. Step S251 is the same as in the case of the first embodiment described above. That is, the processor 21 sets the imaginary position as the boundary position of the roadway area.

On the other hand, when another lane does not exist on the outer side of the first lane L1, that is, when the first lane marking is the edge line (Step S220; No), the processing proceeds to Step S252. Step S252 is the same as in the case of the first embodiment described above. That is, the processor 21 sets the detected position of the first lane marking of the first lane L1 as the boundary position of the roadway area.

In the situation shown in FIG. 8, the processor 21 executes the processing of Steps S230 and S251 when setting the boundary position XBL. Moreover, the processor 21 executes Step S252 when setting the boundary position XBR.

As described above, also in the second embodiment, the processor 21 sets (selects) the imaginary position or the detected position of the first lane marking as the boundary position of the roadway area based on a predetermined condition. As a result, the same effect as in the case of the first embodiment described above can be obtained.

Third Embodiment

Figure 10:
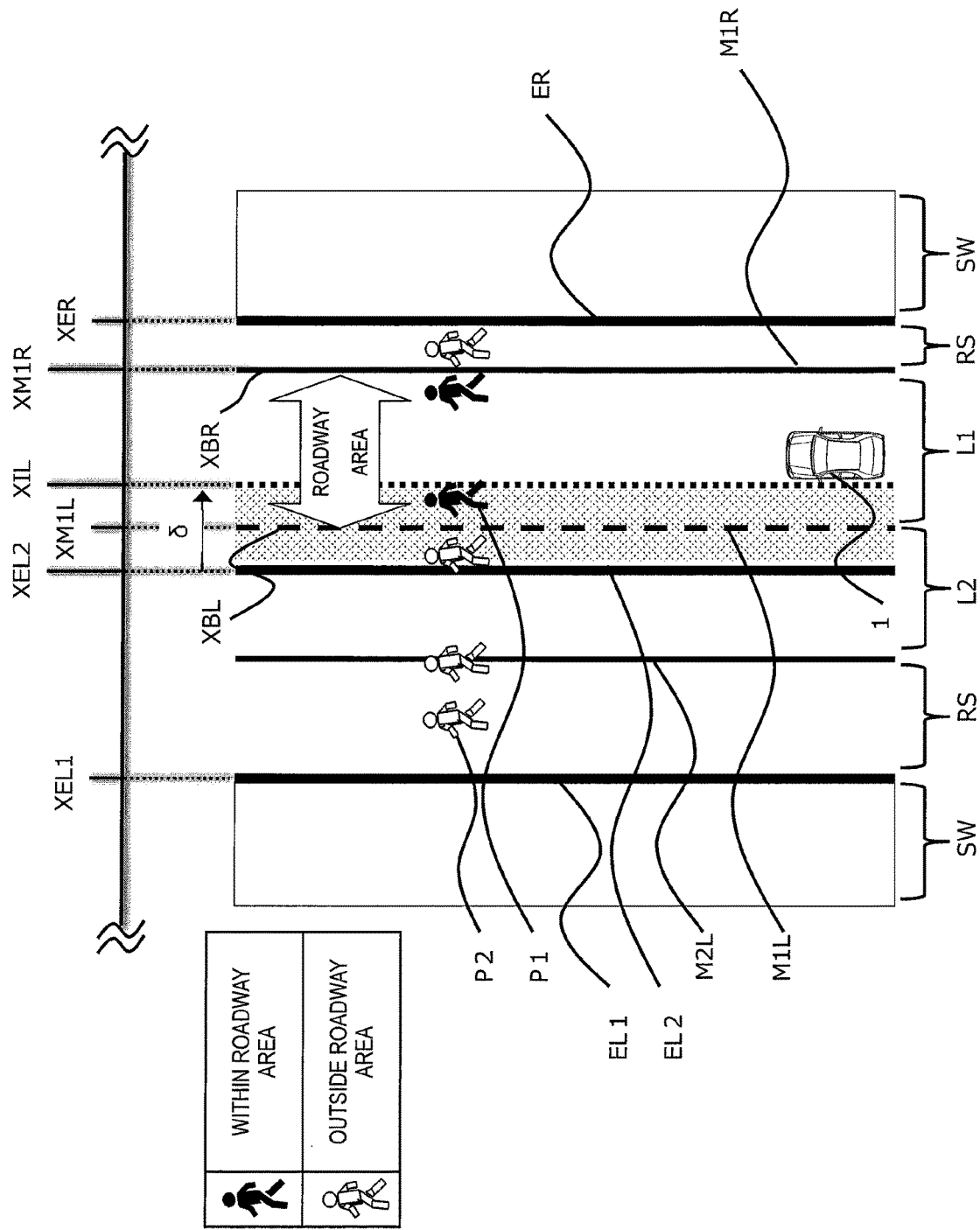
FIG. 10 is a diagram schematically showing an example of the roadway area in a third embodiment of the present disclosure.

In a third embodiment, an example in which the processor 21 sets the roadway area in a manner different from that of the first embodiment and the second embodiment is described. FIG. 10 shows an example of the roadway area in the third embodiment. FIG. 10 is different from FIG. 5 in that the processor 21 does not calculate the imaginary position XIR when setting the detected position XM1R of the first lane marking M1R as the boundary position XBR.

Figure 11:
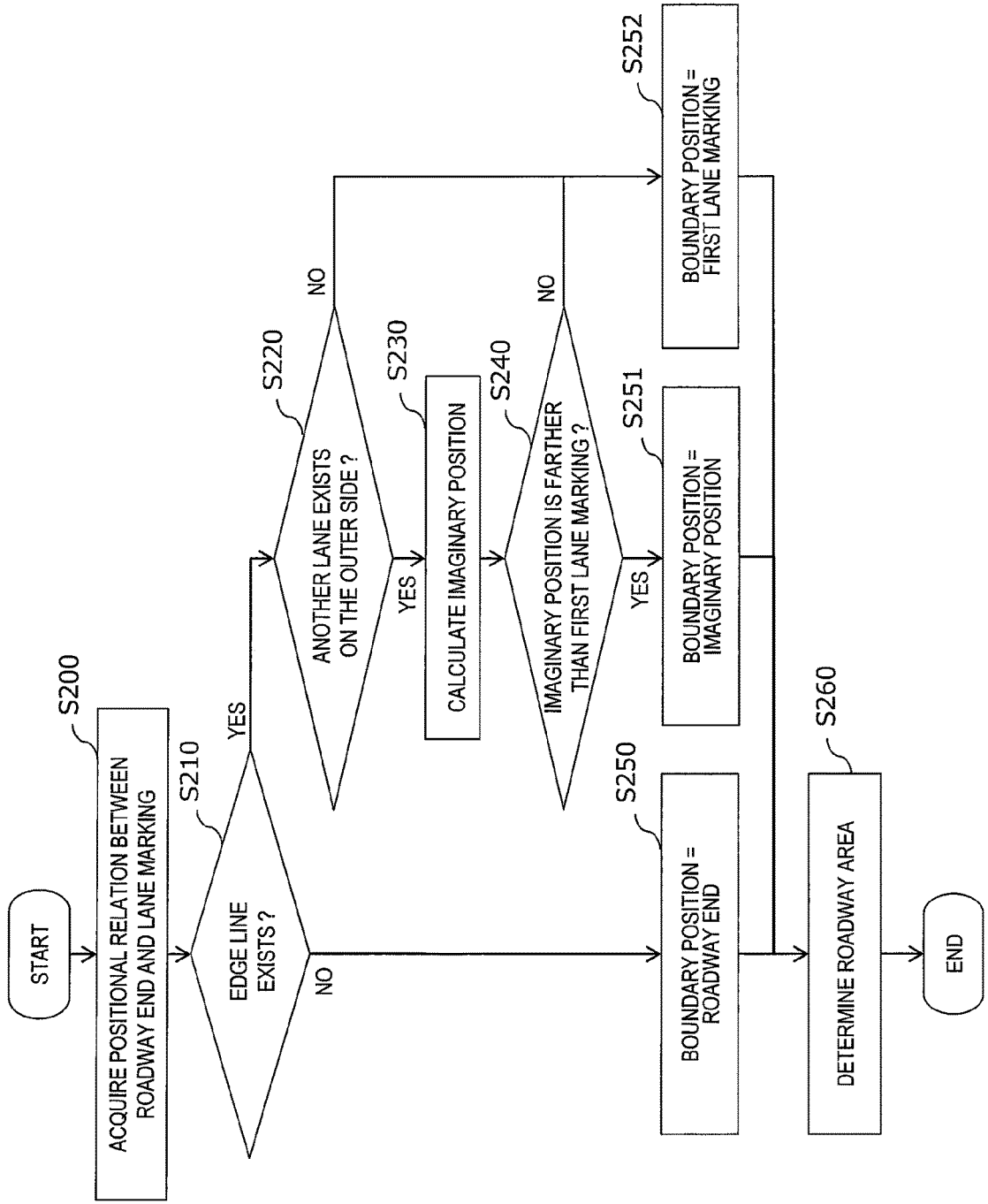
FIG. 11 is a flow chart showing the roadway area setting processing executed by the processor in the third embodiment of the present disclosure.

FIG. 11 is a flow chart showing the roadway area setting processing (Step S103) executed by the processor 21 in the third embodiment. It should be noted that a description of the same processing as in the case of the first and second embodiments will be omitted as appropriate.

After Step S200, Step S210 is executed. When there is no edge line (Step S210; No), the processing proceeds to Step S250. Step S250 is the same as in the case of the first embodiment. On the other hand, when there is the edge line (Step S210; Yes), the processing proceeds to Step S220.

Step S220 is the same as in the case of the second embodiment. When another lane does not exist on the outer side of the first lane L1, that is, when the first lane marking is the edge line (Step S220; No), the processing proceeds to Step S252. Step S252 is the same as in the case of the first embodiment described above. That is, the processor 21 sets the detected position of the first lane marking of the first lane L1 as the boundary position of the roadway area.

On the other hand, when another lane exists on the outer side of the first lane L1, that is, when the first lane marking is not the edge line (Step S220; Yes), the processing proceeds to Step S230. Step S230 is the same as in the case of the first embodiment described above. After Step S230, the processing proceeds to Step S240. Step S240 is the same as in the case of the first embodiment described above.

When the imaginary position is farther than the detected position of the first lane marking when viewed from the vehicle 1 (Step S240; Yes), the processing proceeds to Step S251. Otherwise (Step S240; No), the processing proceeds to Step S252. Steps S251 and S252 are the same as in the case of the first embodiment described above.

In the situation shown in FIG. 10, the processor 21 executes the processing of Steps S230, S240, and S252 when setting the boundary position XBL. When setting the boundary position XBR, the processor 21 executes Step S252 without executing Steps S230 and S240.

As described above, also in the third embodiment, the processor 21 sets (selects) the imaginary position or the detected position of the first lane marking as the boundary position of the roadway area based on a predetermined condition. As a result, the same effect as in the case of the first and second embodiments described above can be obtained.

It should note noted that the present disclosure is not limited to the above-described embodiments and can be embodied by appropriately changing without departing from a scope of the invention.

Figure 12:
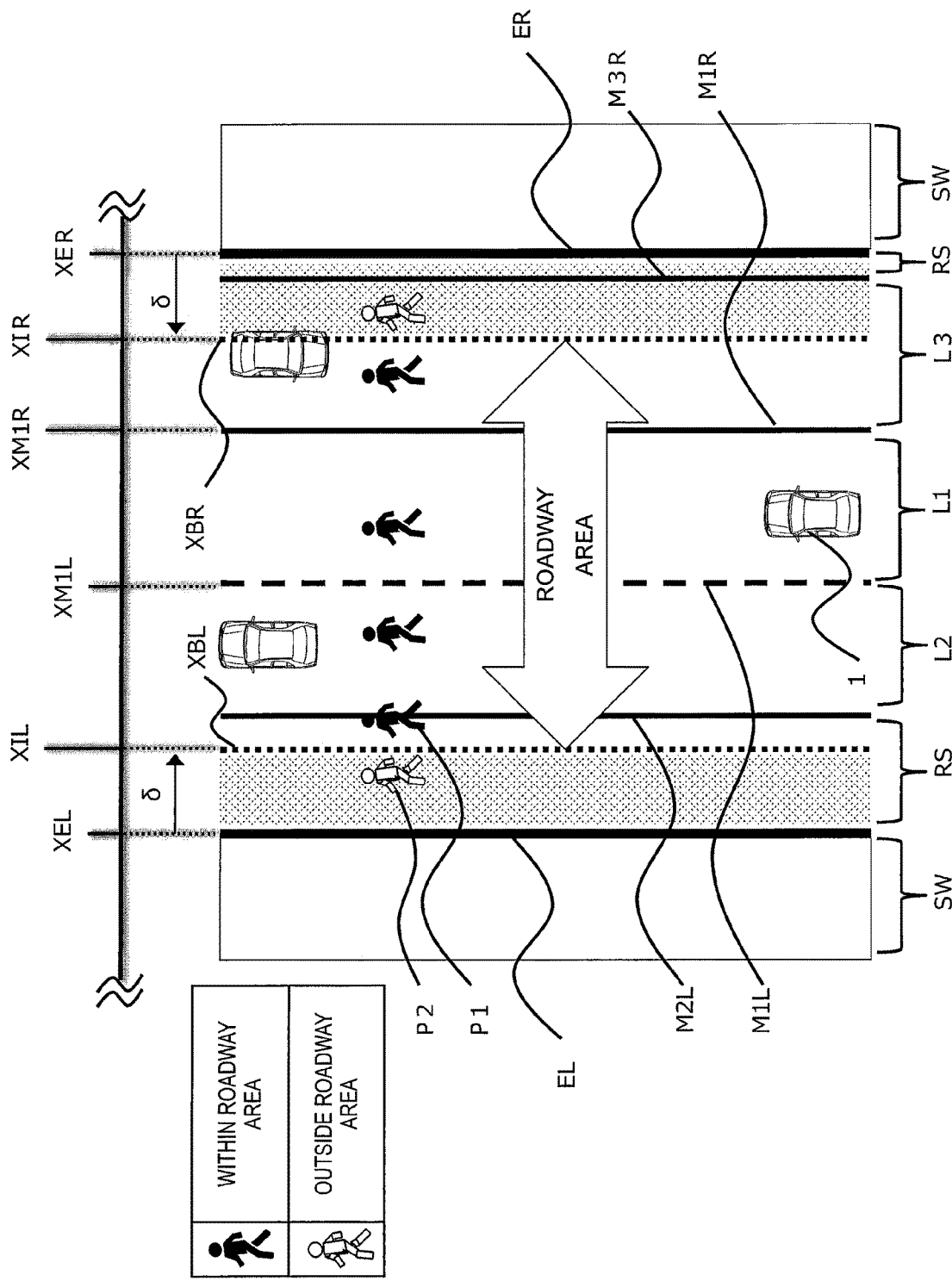
FIG. 12 is a diagram schematically showing in a plan view an example where the roadway area includes an oncoming lane in the first to third embodiment of the present disclosure.

(a) In the drawings shown in the above embodiments, the processor 21 may set the roadway area over an oncoming lane in addition to the first lane L1. For example, when a third lane L3 shown in FIG. 12 is the oncoming lane, the processor 21 may set the roadway area including the third lane L3.

(b) In the above-described embodiments, the processor 21 determines at least the boundary position between two areas, the roadway area and the area outside the roadway area. The processor 21 may further subdivide the roadway area and the area outside the roadway area by using a plurality of boundary positions. Moreover, the processor 21 may set a different assist range for each of the areas. Furthermore, the processor 21 may output different control command values for each of the different assist ranges. Also in this case, the collision avoidance control is more likely to be executed when the avoidance target is located within the roadway area than when the avoidance target is located outside the roadway area.

What is claimed is:

1. A driving assist device that assists driving of a vehicle, the driving assist device comprising:
   a memory device configured to store surrounding situation information indicating a situation around the vehicle detected by a sensor installed on the vehicle; and
   a processor configured to execute:
      roadway area setting processing that sets a roadway area ahead of the vehicle based on the surrounding situation information;
      avoidance target detection processing that detects an avoidance target existing ahead of the vehicle based on the surrounding situation information; and
      collision avoidance control that avoids a collision between the vehicle and the avoidance target, wherein
   the collision avoidance control is more likely to be executed when the avoidance target is within the roadway area than when the avoidance target is outside the roadway area,
   a roadway in which the vehicle exists includes a first lane in which the vehicle exists,
   the processor is further configured to detect a first lane marking being a lane marking of the first lane and a roadway end object being an obstacle representing an end of the roadway, based on the surrounding situation information,
   an imaginary position is a position apart from a detected position of the roadway end object toward the first lane by a constant distance, and
   in the roadway area setting processing, the processor sets the imaginary position or a detected position of the first lane marking as a boundary position of the roadway area based on a predetermined condition.

2. The driving assist device according to claim 1, wherein in the roadway area setting processing, the processor is further configured to:
   set the imaginary position as the boundary position of the roadway area, when the imaginary position is farther than the detected position of the first lane marking when viewed from the vehicle; and
   set the detected position of the first lane marking as the boundary position of the roadway area, when the imaginary position is equal to the detected position of the first lane marking or when the imaginary position is closer than the detected position of the first lane marking when viewed from the vehicle.

3. The driving assist device according to claim 1, wherein an edge line is a lane marking closest to the roadway end object among lane markings existing between the vehicle and the roadway end object, and
   in the roadway area setting processing, the processor is further configured to:
   set the imaginary position as the boundary position of the roadway area, when the first lane marking is not the edge line; and
   set the detected position of the first lane marking as the boundary position of the roadway area, when the first lane marking is the edge line.

4. The driving assist device according to claim 1, wherein the roadway area includes a plurality of lanes.

\* \* \* \* \*